United States Patent [19]

Yamamura

[11] Patent Number: 5,046,151
[45] Date of Patent: Sep. 3, 1991

[54] MAGNETIC BEARING DEVICE
[75] Inventor: Akira Yamamura, Tokyo, Japan
[73] Assignee: Nippon Ferrofluidics Corporation, Tokyo, Japan
[21] Appl. No.: 549,983
[22] Filed: Jul. 9, 1990

Related U.S. Application Data

[63] Continuation of Ser. No. 383,788, Jul. 24, 1989, abandoned.

[51] Int. Cl.$^5$ .............................................. H02K 7/09
[52] U.S. Cl. .................................................. 310/90.5
[58] Field of Search ....................................... 310/90.5

[56] References Cited

U.S. PATENT DOCUMENTS

| | | | |
|---|---|---|---|
| 4,090,745 | 5/1978 | Dohogne | 310/90.5 |
| 4,389,849 | 6/1983 | Beggs | 310/90.5 |
| 4,795,927 | 1/1989 | Morii | 310/90.5 |
| 4,918,345 | 4/1990 | de Guelis | 310/90.5 |

Primary Examiner—R. Skudy
Attorney, Agent, or Firm—Armstrong, Nikaido, Marmelstein, Kubovcik & Murray

[57] ABSTRACT

This invention discloses a magnetic bearing device having a control coil which supports a rotor in a vertical direction and a current controller which increases control current according to an increase in the clearance between the control coil and the rotor. The current controller includes a gain controller which controls the control current with a larger gain when clearance between the control coil and the rotor is less than a certain distance, and with a smaller gain when clearance between the control coil and the rotor is more than that distance.

1 Claim, 5 Drawing Sheets

MAGNETIC BEARING DEVICE

This is a continuation of application Ser. No. 383,788, filed July 24, 1989, now abandoned.

BACKGROUND OF THE INVENTION

1. Industrial field

This invention relates to a magnetic bearing device.

2. Prior art

FIG. 5 shows an example of known magnetic bearing devices conventionally used, and in which reference numeral 1 indicates a rotor to which an armature disk 2 is rotatably attached. A pair of bearing elements 3, 3 are disposed at positions on opposite sides in the axial direction putting the armature disk 2 therebetween. Each of the bearing elements 3, 3 comprises a pair of pole pieces 5, 6 attached to two pole faces of a premanent magnet 4. Each of the pole pieces 5, 6 comprises a part extending in parallel to the armature disk 2 and a top end part extending from the mentioned part to the position adjacent the armature disk 2. A control coil 7 is disposed at a position nearer to the top end part than the permanent magnet 4 between the mentioned pair of pole pieces 5, 6. A sensor coil 8 is disposed at a position nearer to the top end part than the control coil 7. The sensor coil 8 is wound in the same direction as the mentioned control coil 7, such that a bridge is formed between a pair of upper and lower sensor coils 8, 8 so as to differentially output variations of distance between the coil 8 and the armature disk 2.

The known magnetic bearing device of the above construction is controlled with a control current of the control coil 7 in the following manner. For carrying out a simple control as shown in FIG. 6, supposing that control current is I, displacement of the armature disk 2 is x and weight of the rotor 1 is mg, the force acting on the armature disk 2 is expressed as follows:

$$F = a \cdot I^2 / x \quad (1)$$

(where "a" is a proportional constant)
Accordingly, the condition to be F=mg is expressed as follows:

$$I = \sqrt{mg \cdot x/a} \quad (2)$$

This means that the current I required in the control coil 7 varies according to the position x where magnetic attraction of the control coil 7 and weight of the rotor 1 are balanced.

Accordingly, the control current I is controlled so as to be I=k·x in the prior art. This is rewritten as x=I/k, and when substituting this expression for x in the above expression (2), a following expression (3) is obtained:

$$I = mg/a \cdot k \quad (3)$$

It is obviously understood from tha above expression (3) that the rotor 1 can be magnetically supported by a smaller current when establishing the gain k to be larger.

Thus, it seems desirable that the gain k for establishing the control current I be as large as possible.

When establishing the gain k to be as large as possible, however, there arises the serious disadvantage of narrowing the stable region of the rotor 1 with increased gain k. More specifically, establishing a maximum allowable current of the power supply for control current as I, magnetic attraction of the control coil 7 is lowered in the region of $x > I_o/k$ as shown in FIGS. 7(a) and (b), which results in unstable magnetic support.

This invention was made to solve the above-discussed problem and has an object of providing a magnetic bearing device in which small control current is satisfiable yet preventing from the disadvantage of enlargement of unstable region.

Other objects of the invention will become apparent in the course of the description of embodiment later-described.

BRIEF SUMMARY OF THE INVENTION

In order to accomplish the foregoing object, the magnetic bearing device of this invention comprises a control coil which supports a rotor in a vertical direction; and current control means which increase the control current according to an increase in the clearance between the control coil and the rotor. The current control means includes gain control means which controls the control current with a larger gain when the clearance between the control coil and the rotor is less than a certain distance, and with a smaller gain when the clearance between the control coil and the rotor is more than that distance.

In another embodiment of the magnetic bearing device the mentioned current control means includes a frequency response means which suspends control with the mentioned gain control means in response to the high rotary frequency of the rotor, while controlling the control current with almost a constant gain over the full length of the controllable clearance.

DESCRIPTION OF THE PREFERRED EMBODIMENT

Several embodiments of this invention are now described hereinafter with reference to the accompanying drawings.

Figure 1A:
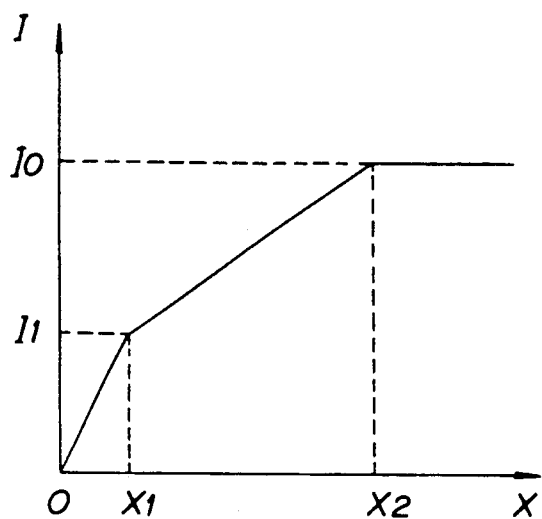
FIGS. 1 (a) and (b) are explanatory diagrams each showing an example of the control characteristics of the magnetic bearing device as an embodiment according to this invention.
Figure 1B:
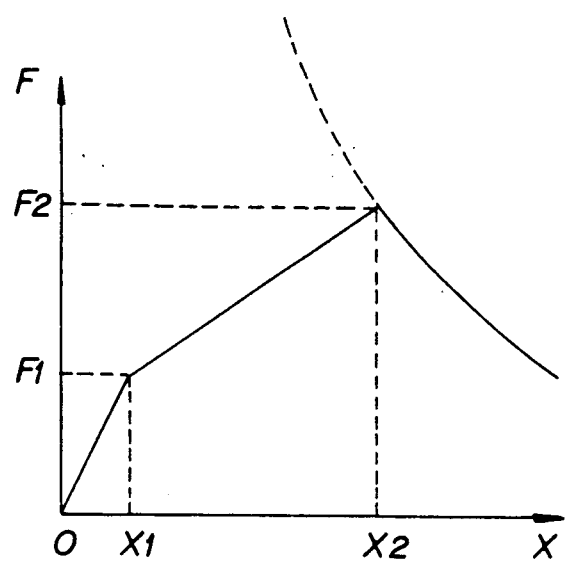
Figure 2:
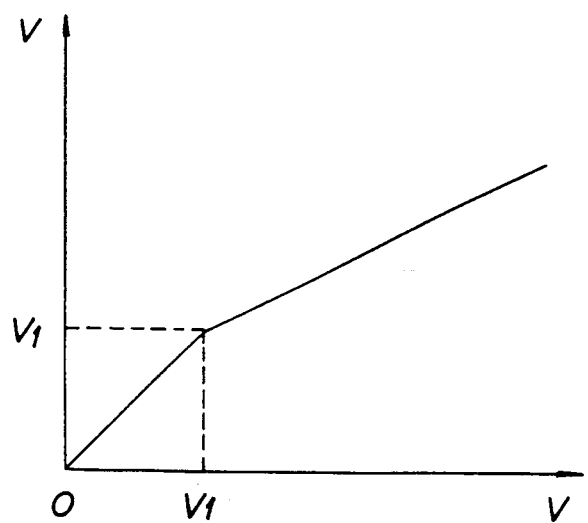
FIG. 2 is an explanatory diagram showing the timing for inserting the soft limiter used in the above embodiment.

This magnetic bearing device adopts a control system so as to achieve a "displacement X - control current I characteristic" and a "displacement X - magnetic attraction F characteristic (stationary characteristic)" as shown in FIGS. 1(a) and (b). That is, it is intended in this embodiment that: $X_1$ is to be mg/a (mg=weight of the rotor 1; a=a proportional constant). $k_2 < x_1$; gain k is enlarged at this time; control current be reduced in the region of $0<X<X_1$ when balancing weight of the rotor 1 and the magnetic attraction of the control coil 7; while the gain k is returned to a normal small value in the region of $X_1<X<X_2$ to enlarge the stable region of $0<X<X_2$. To achieve such characteristics, a soft limiter is inserted in the control circuit to reduce the gain k at the voltage V, corresponding to the control current I, of the control coil 7 as shown in FIG. 2.

Figure 3:
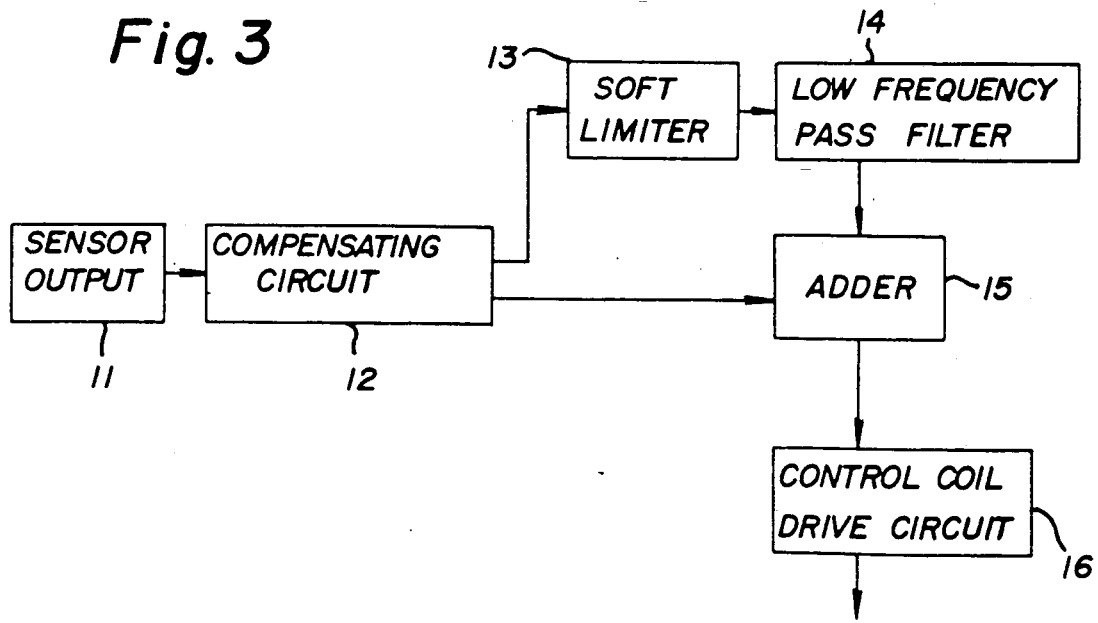
FIG. 3 is a block diagram of an example of the control circuit adopted in the above embodiment.
Figure 4:
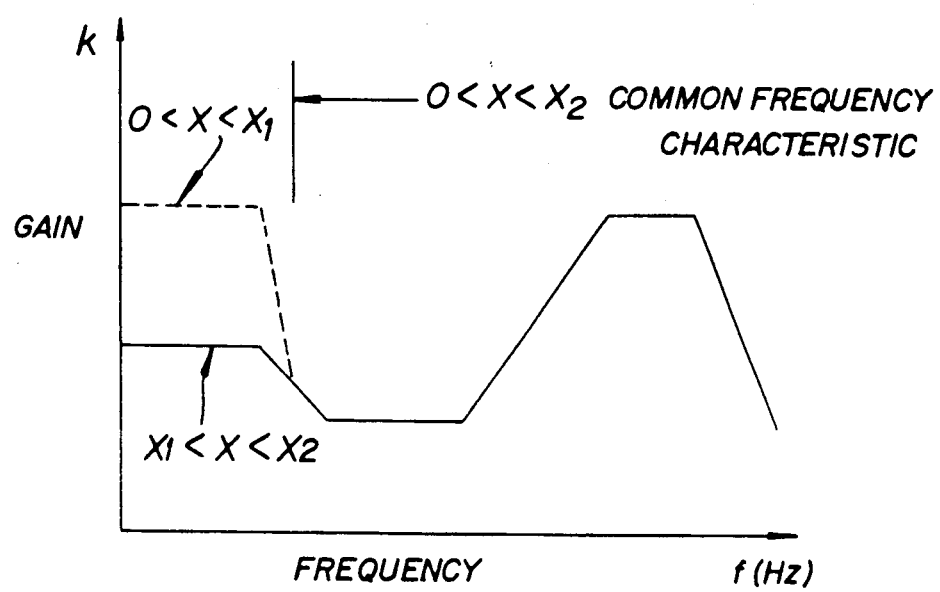
FIG. 4 is an explanatory diagram showing a relation between frequency and gain obtained in the embodiment.
Figure 6:
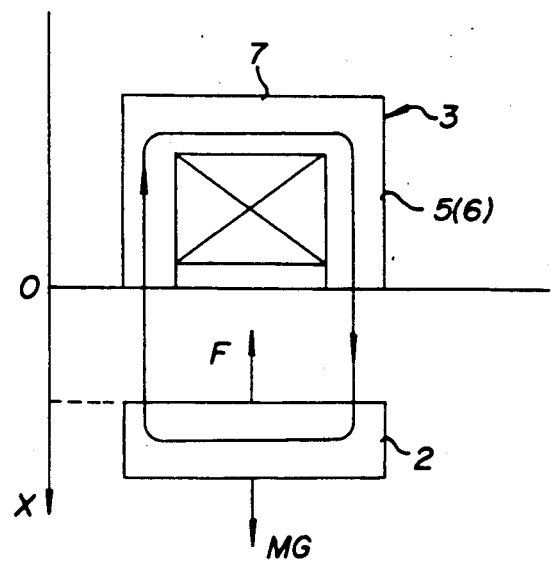
FIG. 6 is an explanatory diagram of a model showing the control characteristics in the magnetic bearing device shown in FIG. 5.

When employing the control system described above, though the gain k is high resulting in stationary stability being attained in the area near the point zero of $0<X<X_1$, there arises a disadvantage of easy oscillation. To prevent such disadvantage, a control circuit as shown in FIG. 3 is employed. In the drawing, reference numeral 11 indicates an output circuit of the sensor coil 8, numeral 12 indicates a compensating circuit, numeral 13 indicates a soft limiter (gain control means), numeral 14 indicates a low frequency pass filter (frequency response control means), numeral 15 indicates an adder, and numeral 16 indicates a control coil drive circuit, respectively. As a result of such an arrangement, the control of the gain k is performed in the low frequency region as mentioned above, while a small gain k is kept throughout the $0<X<X_2$ range in the high frequency region (see FIG. 4).

Figure 5:
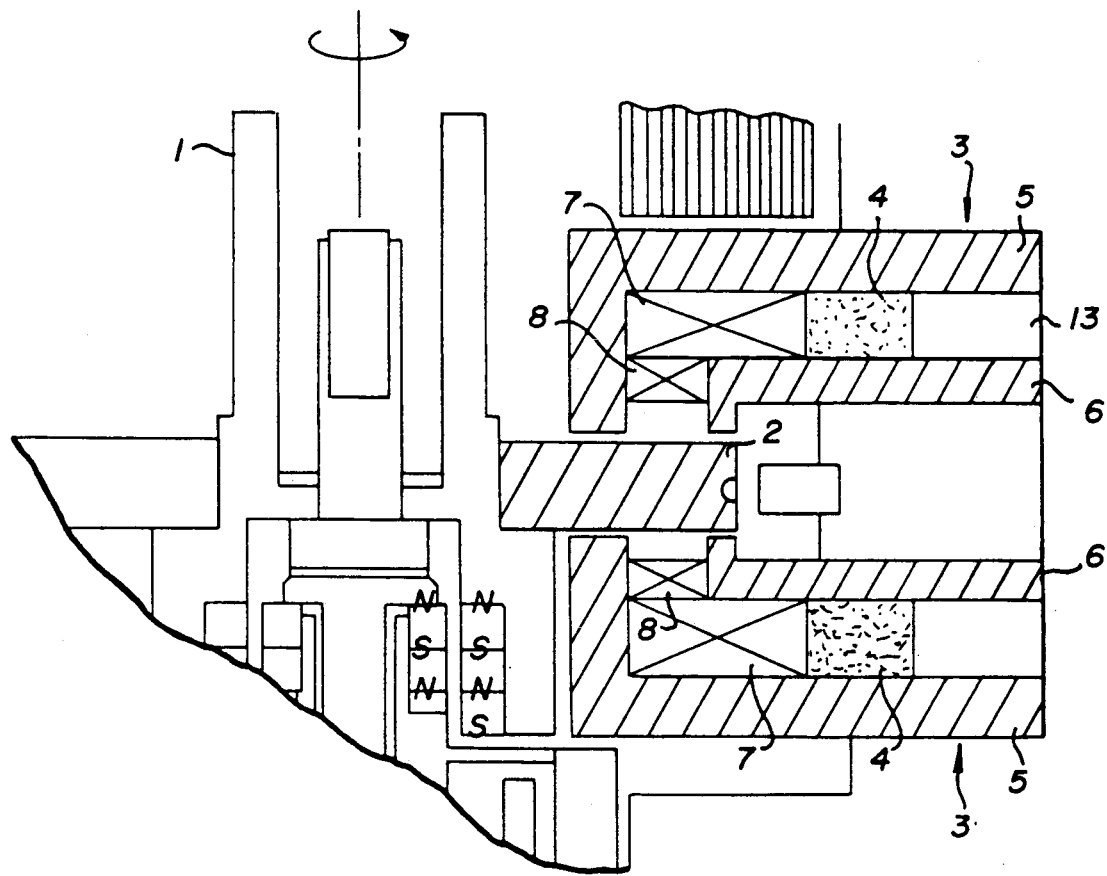
FIG. 5 is a sectional view of an example of construction of the magnetic bearing device in the prior art.
Figure 7A:
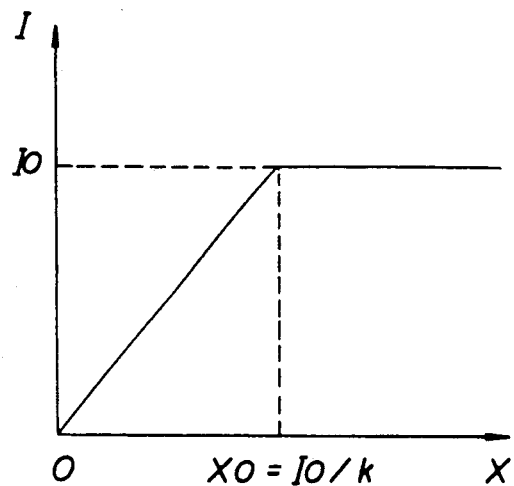
FIGS. 7(a) and (b) are explanatory diagrams showing control characteristic in the prior art.
Figure 7B:
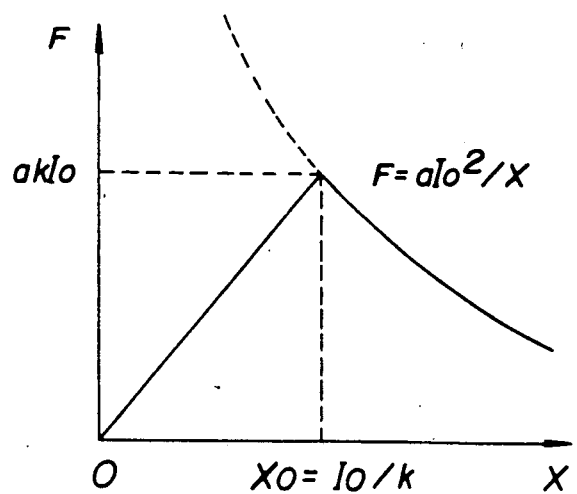

This invention can be preferably applied to a magnetic bearing device of any constitution including the one shown in FIG. 5 or other.

The invention is not limited to the foregoing embodiment, and it will be obvious for those skilled in the art to vary or modify the invention without departing from the spirit and scope of the appended claim.

Effect of the invention

In the magnetic bearing device of this invention, as a result of the construction described above, a smaller control current can be satisfactory while still preventing from the disadvantage of enlarging the unstable region peculiar to the prior art, eventually resulting in efficient magnetic support.

What is claimed is:

1. A magnetic bearing device comprising: a control coil which supports a rotor in a vertical direction; and current control means which increases a control current in response to an increase of clearance between the control coil and the rotor and to a rotary frequency of the rotor, said current control means including gain control means which controls the control current with a larger gain when the clearance between the control coil and the rotor is less than a certain distance, and with a smaller gain when the clearance between the control coil and the rotor is more than the distance wherein said current control means further includes a frequency response means which suspends control with said gain control means in response to a high rotary frequency of the rotor, while controlling the control current with a substantially constant gain over the clearance between the control coil and the rotor that can be controlled.

* * * * *